United States Patent
Pfadler et al.

(10) Patent No.: US 11,662,720 B2
(45) Date of Patent: May 30, 2023

(54) METHOD, COMPUTER PROGRAM, APPARATUS, VEHICLE AND NETWORK COMPONENT FOR DETERMINING A SPEED LIMIT FOR A TELE-OPERATED VEHICLE

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE); Israel Gonzalez Vazquez, Wolfsburg (DE)

(73) Assignee: Volkswagen Aktiengesellschaft

( * ) Notice: Subject to any disclaimer, the term of this patent is extended or adjusted under 35 U.S.C. 154(b) by 62 days.

(21) Appl. No.: 17/206,215

(22) Filed: Mar. 19, 2021

(65) Prior Publication Data

US 2021/0294319 A1    Sep. 23, 2021

(30) Foreign Application Priority Data

Mar. 20, 2020    (EP) .................................... 20164458

(51) Int. Cl.
    *G05D 1/00*    (2006.01)
    *G05D 1/02*    (2020.01)
    *H04B 17/373*    (2015.01)

(52) U.S. Cl.
    CPC ......... *G05D 1/0022* (2013.01); *G05D 1/0223* (2013.01); *H04B 17/373* (2015.01)

(58) Field of Classification Search
    CPC ... G05D 1/0022; G05D 1/0223; H04B 17/373
    See application file for complete search history.

(56) References Cited

U.S. PATENT DOCUMENTS

| | | |
|---|---|---|
| 2017/0124781 A1 | 5/2017 | Douillard et al. |
| 2018/0157264 A1* | 6/2018 | Isaacs ..................... G08G 1/00 |
| 2018/0270624 A1 | 9/2018 | Lee et al. |

(Continued)

FOREIGN PATENT DOCUMENTS

| | | |
|---|---|---|
| EP | 3790295 A1 | 3/2021 |
| JP | 5347531 B2 * | 11/2013 |
| WO | 2019180700 A1 | 9/2019 |

OTHER PUBLICATIONS

JP-5347531-B2 machine translation (Year: 2013).*

(Continued)

*Primary Examiner* — Anne Marie Antonucci
*Assistant Examiner* — Jingli Wang
(74) *Attorney, Agent, or Firm* — Barnes & Thornburg, LLP

(57) ABSTRACT

A method, a computer program, an apparatus, a transportation vehicle, and a network component for determining a speed limit for a tele-operated transportation vehicle. The method for determining a speed limit for a tele-operated transportation vehicle includes obtaining information related to an environment of the tele-operated transportation vehicle; obtaining information related to a predictive quality of service (pQoS) of a communication link between the tele-operated transportation vehicle and a tele-operator of the transportation vehicle; and determining the speed limit based on the information related to the environment of the tele-operated transportation vehicle and the information related to the pQoS.

23 Claims, 3 Drawing Sheets

(56) References Cited

U.S. PATENT DOCUMENTS

2019/0320328 A1    10/2019  Magzimof et al.
2020/0201315 A1*    6/2020  Gogna ................. H04W 24/08
2020/0349833 A1*   11/2020  Lerner ................. G08G 1/0125

OTHER PUBLICATIONS

5GCROCO; Fifth Generation Cross-Border Control; downloaded from https://5gcroco.eu; downloaded prior to Mar. 20, 2020.

Hetzer et al.; 5G Connected and Automated Driving: Use Cases and Technologies in Cross-border Environments; 2019 European Conference on Networks and Communications (EUCNC); IEEE; Jun. 18, 2019; pp. 78-82.

Hruschka et al.; Risk Assessment for Integral Safety in Automated Driving; 2019 2nd International Conference on Intelligent Autonomous Systems (ICoIAS); 2019; pp. 102-109.

Search Report for European Patent Application No. 20164458.0; dated Jul. 28, 2020.

Office Action; European Patent Application No. 20164458.0; dated Nov. 4, 2022.

\* cited by examiner

10

Obtaining information related to an environment of the tele-operated vehicle ~12

Obtaining information related to a predictive quality of service, pQoS, of a communication link between the tele-operated vehicle and a tele-operator of the vehicle ~14

Determining the speed limit based on the information related to the environment of the tele-operated vehicle and the information related to the pQoS ~16

Fig. 1

METHOD, COMPUTER PROGRAM, APPARATUS, VEHICLE AND NETWORK COMPONENT FOR DETERMINING A SPEED LIMIT FOR A TELE-OPERATED VEHICLE

PRIORITY CLAIM

This patent application claims priority to European Patent Application No. 20164458.0, filed 20 Mar. 2020, the disclosure of which is incorporated herein by reference in its entirety.

SUMMARY

Illustrative embodiments relate to a method, a computer program, an apparatus, a transportation vehicle, and a network component for determining a speed limit for a tele-operated transportation vehicle, more specifically, but not exclusively, to a concept for determining a speed limit for a tele-operated transportation vehicle taking into account communication link condition and traffic situation.

BRIEF DESCRIPTION OF THE DRAWINGS

Disclosed embodiments will be described by way of example only, and with reference to the accompanying figures, in which:

FIG. 1 illustrates a block diagram of an exemplary embodiment of a method for determining a speed limit for a tele-operated transportation vehicle;

DETAILED DESCRIPTION

Figure 2:
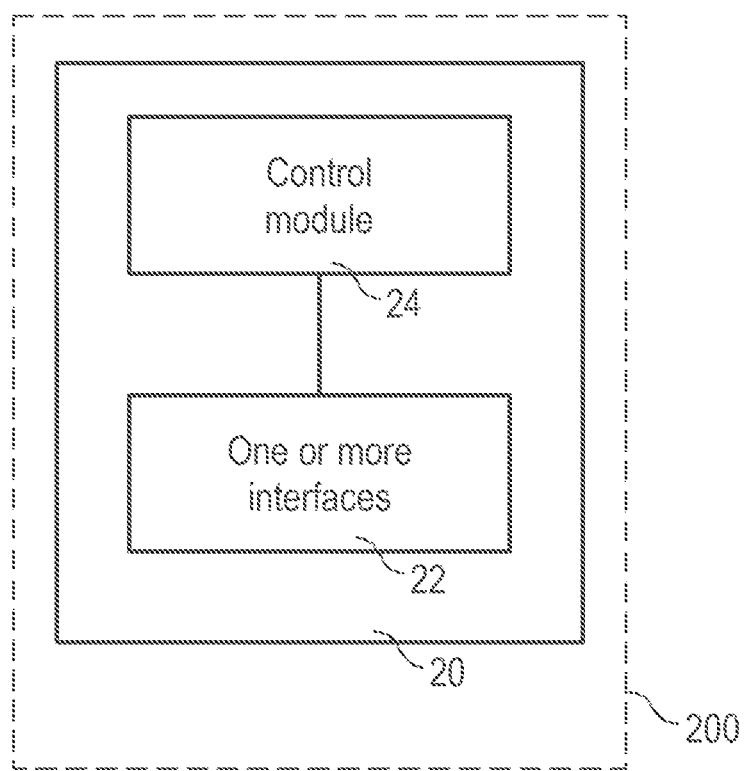
FIG. 2 illustrates a block diagram of an exemplary embodiment of an apparatus for determining a speed limit for a tele-operated transportation vehicle, an exemplary embodiment of a transportation vehicle, and an exemplary embodiment of a network component.

Vehicular communication is a field of research and development. To enable an autonomous or semi-autonomous driving of transportation vehicles, transportation vehicles are expected to use Vehicle-to-Vehicle-communication (V2V) and Vehicle-to-Network (V2N) communication, e.g., to coordinate driving maneuvers and/or to receive tele-operated driving instructions. This communication is generally wireless, i.e., transportation vehicles may wirelessly communicate with other transportation vehicles in their vicinity and/or with backend services via cellular mobile communication systems.

Tele-operated driving (ToD) is getting more and more interest. The main concept of ToD is an automated vehicle (AV) remotely driven by a control/command center (CC). CC and AV may be far away from each other. They are connected via a radio communication system (e.g., 4th, 5th Generation mobile communication systems (4G, 5G)) and its backhaul. Therefore, a certain end-to-end (E2E) delay and data rate are to be expected. The CC controls the automated vehicle (AV) via remote control. In direct control the CC directly controls one or more actuators of the AV.

For example, 5GCroCo will trial 5G technologies in the cross-border corridor along France, Germany and Luxembourg. In addition, 5GCroCo also aims at defining new business models that can be built on top of this unprecedented connectivity and service provisioning capacity. Further information can be found on the Internet at 5gcroco.

Document WO 2019/180700 A1 describes a concept using a vehicular Artificial Intelligence (AI) unit, which is configured: to receive inputs from a plurality of vehicular sensors of a transportation vehicle; to locally process within the transportation vehicle at least a first portion of the inputs; to wirelessly transmit via a vehicular wireless transmitter at least a second portion of the inputs to a remote tele-driving processor located externally to the transportation vehicle; to wirelessly receive via a vehicular wireless receiver from the remote tele-driving processor, a remotely-computed processing result that is received from a remote Artificial Intelligence (AI) unit; and to implement a vehicular operating command based on the remotely-computed processing result, via an autonomous driving unit of the transportation vehicle or via a tele-driving unit of the transportation vehicle.

Document US 2018/0270624 A1 discloses a method for providing a multimedia broadcast/multicast service (MBMS) to a terminal related to a transportation vehicle by a broadcast and multicast service center (BM-SC). The method includes identifying at least one candidate service area that the terminal is predicted to pass through, and transmitting, to an MBMS-gateway (MBMS-GW) a request for configuring the radio bearer of the at least one candidate service area.

Document US 2019/0320328 A1 describes a concept for a connected transportation vehicle environment, in which network connection parameters such as a network congestions window and bit rate are automatically adjusted dependent on a location of a transportation vehicle to optimize network performance. A geospatial database stores learned relationships to optimize network performance of a connected transportation vehicle at different physical locations when configured in accordance with different network parameters. The transportation vehicle can then adjust its network parameters dynamically dependent on its location. A transportation vehicle may maintain multiple connections to different networks concurrently for transmitting duplicate data of a data stream with the transportation vehicle independently adjusting parameters associated with different networks to optimize performance.

C. M. Hruschka, D. Töpfer and S. Zug, "Risk Assessment for Integral Safety in Automated Driving," 2019 2nd International Conference on Intelligent Autonomous Systems (ICoIAS), Singapore, Singapore, 2019, pp. 102-109. doi: 10.1109/ICoIAS.2019.00025 present a risk assessment approach that allows to control the behavior of self-driving cars. This continuous real-time risk assessment considers uncertainties as well as accident severity predictions to intervene integrally. It allows predictive traffic interaction and collision avoidance, and also an intelligent crash interaction. These decisions are made on incomplete data, due to imperfect environment perception data and road users' unknown intentions. Advanced, situational and numerical dependencies are regarded. Furthermore, the benefit of multiple approximating accident severity estimations are discussed.

Document HETZER DIRK ET AL: "5G Connected and Automated Driving: Use Cases and Technologies in Cross-border Environments", 2019 EUROPEAN CONFERENCE ON NETWORKS AND COMMUNICATIONS (EUCNC), IEEE, 18 Jun. 2019 (2019-'06-18), pages 78-82, illuminates the 5GCroCo project, with a total budget of 17 million Euro and partially funded by the European Commission, which aims at validating 5G technologies in the Metz-Merzig- Luxembourg cross-border corridor, traversing the borders between France, Germany and Luxembourg. 5GCroCo validation will focus on three use cases: 1) tele-operated driving, 2) high-definition map generation and distribution for automated transportation vehicles, and 3) Anticipated Cooperative Collision Avoidance.

Document US 2017/0124781 A1 relates generally to autonomous transportation vehicles and associated mechanical, electrical and electronic hardware, computer software and systems, and wired and wireless network communications to provide an autonomous transportation vehicle fleet as a service. A method may include receiving data associated with a sensor measurement of a perceived object, determining a label associated with the perceived object based on an initial calibration, retrieving log file data associated with the label, determining a calibration parameter associated with the sensor measurement based on the retrieved log file data, and storing the calibration parameter in association with a sensor associated with the sensor measurement. Sensors may be calibrated on the fly while the autonomous transportation vehicle is in operation using one or more other sensors and/or fused data from multiple types of sensors.

There is a demand for an improved concept for control in ToD.

Disclosed embodiments are based on the finding that ToD control performance is linked to communication link performance. For example, latency and data rate performance of a communication link between a CC/tele-operator and a tele-operated transportation vehicle contribute significantly to a reaction time of the transportation vehicle. In the uplink, i.e., the communication link from the transportation vehicle to the CC, there are communication latencies involved between data acquisition at the transportation vehicle (e.g., video and other sensing) and data presentation (e.g., video display). The tele-operator hence reacts to delayed data and issues a control command, which undergoes further communication delay when being communicated to the transportation vehicle in the downlink (from the CC to the transportation vehicle). To avoid safety risks, the speed limit of the transportation vehicle should be the lower the higher the communication delays. It is one finding of exemplary embodiments that the speed limit for a remote operated transportation vehicle should depend on the predicted quality of service (pQoS) of the communication link. It is a further finding that the speed limit should also depend on the traffic environment the remote operated transportation vehicle is in. For example, on a Saturday afternoon in a residential area on a sunny day the speed limit should be far lower than on a weekday on a highway in the middle of the night at low traffic density.

Disclosed embodiments provide a method for determining a speed limit for a tele-operated transportation vehicle. The method comprises obtaining information related to an environment of the tele-operated transportation vehicle, and obtaining information related to a predictive quality of service, pQoS, of a communication link between the tele-operated transportation vehicle and a tele-operator of the transportation vehicle. The method further comprises determining the speed limit based on the information related to the environment of the tele-operated transportation vehicle and the information related to the pQoS. Embodiments Disclosed embodiments may consider a quality of the communication link and environmental information when determining a speed limit for a tele-operated transportation vehicle.

The method may further comprise applying the speed limit to the transportation vehicle while being tele-operated. Speed limits of tele-operated transportation vehicles may be adapted to radio and traffic conditions in exemplary embodiments.

In some disclosed embodiments the communication link may comprise a wireless part and wired part and the pQoS may at least relate to the wireless part. For example, the wireless part of a communication link may be a main contributor for communication delays/latencies and at least some disclosed embodiments may focus on the main contributor.

The pQoS may comprise at least one of a latency and a data rate. The speed limit determination may consider data rate and latency on a communication link and therefore determine a reliable impact of the communication on the reaction time of the transportation vehicle.

For example, the obtaining of the information related to the environment may comprise determining the information related to the environment based on sensor data of the tele-operated transportation vehicle, the obtaining of the information related to the environment may comprise determining the information related to the environment based on sensor data shared among transportation vehicles in the environment of the tele-operated transportation vehicle, and/or the obtaining of the information related to the environment may comprise receiving the information related to the environment from a communication network. Disclosed embodiments may consider information on the environment of the transportation vehicle, which may consume capacity of the communication link to the transportation vehicle or other information on the same environment, which may be received from other sources, e.g., one or more other transportation vehicles, traffic infrastructure, or other network components.

The determining of the speed limit may comprise determining a first lower speed limit for a first lower pQoS and the determining of the speed limit may comprise determining a second higher speed limit for a second higher pQoS in some exemplary embodiments. Disclosed embodiments may adapt the speed limit to the pQoS in a way that the better the pQoS the higher the speed limit.

The determining of the speed limit may comprise determining a first lower speed limit for a first environment with first higher traffic dynamics and the determining of the speed limit may comprise determining a second higher speed limit for a second environment with second lower traffic dynamics in exemplary embodiments. Disclosed embodiments may adapt the speed limit to traffic dynamics in a way that the higher the traffic dynamics the lower the speed limit.

In some exemplary embodiments the obtaining of the information related to the environment comprises receiving the information related to the environment from traffic infrastructure in the environment of the tele-operated transportation vehicle. Information from other entities may be considered for the speed limit.

The determining of the speed limit may be further based on a probability of an occurrence of an event triggering a time-critical reaction of the tele-operated transportation vehicle. The speed limit may hence consider traffic/environmental situation implications on a need for time-critical maneuvers of the transportation vehicle, e.g., a probability of emergency brake maneuvers.

The probability of the occurrence of the event triggering the time-critical reaction may be related to the environment of the tele-operated transportation vehicle. The environmental situation and properties, e.g., time of day, category of environment (highway, or residential), etc. may be considered for determining the speed limit in disclosed embodiments.

For example, the obtaining of the information related to the pQoS of the communication link between the tele-operated transportation vehicle and the tele-operator of the transportation vehicle may comprise receiving the information related to the pQoS from a communication system. Disclosed embodiments may exploit information provided by involved communications systems, e.g., mobile communication systems.

Disclosed embodiments further provide a computer program having a program code for performing one or more of the described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Another exemplary embodiment is an apparatus for determining a speed limit for a tele-operated transportation vehicle. The apparatus comprises one or more interfaces configured to communicate in a communication network; and a control module configured to control the one or more interfaces, wherein the control module is further configured to perform one of the methods described herein. Further disclosed embodiments are a transportation vehicle comprising the apparatus and a network component comprising the apparatus.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an exemplary embodiment of a method 10 for determining a speed limit for a tele-operated transportation vehicle. The method 10 comprises obtaining 12 information related to an environment of the tele-operated transportation vehicle. The method 10 further comprises obtaining 14 information related to a pQoS of a communication link between the tele-operated transportation vehicle and a tele-operator of the transportation vehicle. The method 10 further comprises determining 16 the speed limit based on the information related to the environment of the tele-operated transportation vehicle and the information related to the pQoS.

In disclosed embodiments the speed limit is the maximum speed that the transportation vehicle can drive while being tele-operated. The method 10 may further comprise applying the speed limit to the transportation vehicle while being tele-operated. Tele-operating the transportation vehicle is to be understood as a remote operation of the transportation vehicle. For example, a remote operator or tele-operator located at a CC takes over control of the transportation vehicle by control commands (e.g., acceleration/deceleration commands, steering commands, etc.). Tele-operated driving (ToD) might become a key technology to solve issues with L4/L5 (L4: highly automatic, L5: fully automatic) driven transportation vehicles, such as interpretation issues or deadlocks (situations, which cannot be resolved by autonomous or automatic control mechanisms only).

These issues occur when automatic driven vehicles (AV) are not able to interpret and to solve a situation due to not clear traffic conditions, e.g., an accident or a construction site. These transportation vehicles may need external instruction from someone else to solve the situation, which can be the so-called control center (CC). A ToD vehicle will be driven remotely by CC, an operator therein, respectively.

The ToD performance is related to the communication link performance. The communication link may comprise a wireless part and wired part and the pQoS may relate at least to the wireless part in some exemplary embodiments. For example, the communication link comprises the air interface (Uu link in 3GPP (3rd Generation Partnership Project), wireless part of the communication link) between the transportation vehicle and the base station (access node) and then the connection through the operator backbone (core network, wired part). Depending on the quality of the link, the control of the transportation vehicle will be adapted in disclosed embodiments: the transportation vehicle will be controlled directly (joystick-like) or indirectly (waypoints, or environmental model editions). The environment may be characterized by the type of road, e.g., highway, country road, city road, residential area road, number of lanes, traffic density, traffic dynamics, etc. Moreover, the time of day, the day of week, the weather, current traffic condition/density;

and other factors may be comprised in the information related to the environment of the tele-operated transportation vehicle.

Disclosed embodiments may provide a remote-control maximal speed definition based on pQoS and transportation vehicle environment. Two main factors are crucial for the determination of the driving speed of the AV in a ToD session. The first is predictive quality of service (pQoS), e.g., the future data rate and even more important latency. The pQoS may comprise at least one of a latency and a data rate. In exemplary embodiments QoS or pQoS may comprise one or more elements of the group of, latency, data rate, error rate/reliability, packet error rate, packet inter-reception time, etc. Such QoS may depend on different factors, e.g., the radio access technology (RAT), pathloss, environment, interference situation, load, processing delay, etc.

Indeed, these QoS indicators negatively affect the control of the transportation vehicle and as a consequence the speed of the AV needs to be adapted. The second influence factor is the AV environment and the required reaction time, which is needed for the remote controlling from the CC to the AV. E.g., a remotely driven AV located in a downtown area and surrounded by moving humans does not allow so much latency as a transportation vehicle driving on an abandoned street.

FIG. 2 illustrates a block diagram of an exemplary embodiment of an apparatus 20 for determining a speed limit for a tele-operated transportation vehicle 200, an exemplary embodiment of a transportation vehicle 200, and an exemplary embodiment of a network component 200. As shown in FIG. 2 the apparatus 20 for determining the speed limit for the tele-operated transportation vehicle 200 comprises one or more interfaces 22 configured to communicate in a communication network. The apparatus 20 further comprises a control module 24, which is configured to control the one or more interfaces 22, and which is coupled to the one or more interfaces 22. The control module 24 is further configured to perform one of the methods 10 described herein. As further shown in FIG. 2 in broken lines (as optional from the perspective of the apparatus 20), an entity 200 comprising an exemplary embodiment of the apparatus 20 is another disclosed embodiment. Such entity 200 may be a transportation vehicle or a network component (e.g., a server, a computer, a base station, hardware, CC, etc.)

The apparatuses 20 and the transportation vehicle or network component 200 may communicate at least partly through a mobile communication system. The mobile communication system, may, for example, correspond to one of the Third Generation Partnership Project (3GPP)-standardized mobile communication networks, where the term mobile communication system is used synonymously to mobile communication network. The messages (input data, control information) may hence be communicated through multiple network nodes (e.g., internet, router, switches, etc.) and the mobile communication system, which generates the delay or latencies considered in exemplary embodiments. For example, the uplink direction refers to the direction from a transportation vehicle to the command center and the downlink direction refers from the command center to the transportation vehicle.

The mobile or wireless communication system may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs/vehicles. A base station transceiver can be operable or configured to communicate with one or more active mobile transceivers/vehicles and a base station transceiver can be located in or adjacent to a coverage area of another base station transceiver, e.g., a macro cell base station transceiver or small cell base station transceiver. Hence, disclosed embodiments may provide a mobile communication system comprising two or more mobile transceivers/vehicles 200 and one or more base station transceivers, wherein the base station transceivers may establish macro cells or small cells, as, e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle, a road participant, a traffic entity, traffic infrastructure etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver or transportation vehicle can be associated with a base station transceiver or cell. The term cell refers to a coverage area of radio services provided by a base station transceiver, e.g., a NodeB (NB), an eNodeB (eNB), a gNodeB, a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. A base station transceiver may operate multiple sectorized antennas. In the following, a cell may represent an according base station transceiver generating the cell or, likewise, a base station transceiver may represent a cell the base station transceiver generates.

The apparatus 20 may be comprised in a server, a base station, a NodeB, a UE, a transportation vehicle, a network component, a relay station, or any service coordinating network entity in disclosed embodiments. It is to be noted that the term network component may comprise multiple sub-components, such as a base station, a server, etc.

In disclosed embodiments the one or more interfaces 22 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 22 may comprise further components to enable according communication in the (mobile) communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 22 may be coupled to one or more antennas, which may correspond to any transmit and/or receive antennas, such as horn antennas, dipole antennas, patch antennas, sector antennas etc. In some examples the one or more interfaces 22 may serve the purpose of transmitting or receiving or both, transmitting and receiving, information, such as information, input data, control information, further information messages, etc.

As shown in FIG. 2 the respective one or more interfaces 22 are coupled to the respective control module 24 at the apparatus 20. In disclosed embodiments the control module 24 may be implemented using one or more processing units, one or more processing devices, any method or mechanism for processing, such as a processor, a computer or a programmable hardware component being operable with accordingly adapted software. In other words, the described functions of the control module 24 may as well be implemented in software, which is then executed on one or more programmable hardware components. Such hardware components may comprise a general-purpose processor, a Digital Signal Processor (DSP), a micro-controller, etc.

In exemplary embodiments, communication, i.e., transmission, reception or both, may take place among mobile transceivers/vehicles 200 directly, e.g., forwarding input data or control information to/from a control center. Such communication may make use of a mobile communication system. Such communication may be carried out directly, e.g., by Device-to-Device (D2D) communication. Such communication may be carried out using the specifications of a mobile communication system. An example of D2D is direct communication between transportation vehicles, also referred to as Vehicle-to-Vehicle communication (V2V), car-to-car, Dedicated Short Range Communication (DSRC), respectively. Technologies enabling such D2D-communication include 802.11p, 3GPP systems (4G, 5G, NR and beyond), etc.

In disclosed embodiments, the one or more interfaces 22 can be configured to wirelessly communicate in the mobile communication system, e.g., in an exemplary embodiment in which the apparatus 20 is implemented in transportation vehicle 200 and the method 10 is carried out at the transportation vehicle 200. To do so, radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

To determine a speed limit in an exemplary embodiment for a tele-operated transportation vehicle 200, it may be critical to predict the QoS in the communication network.

Figure 3:
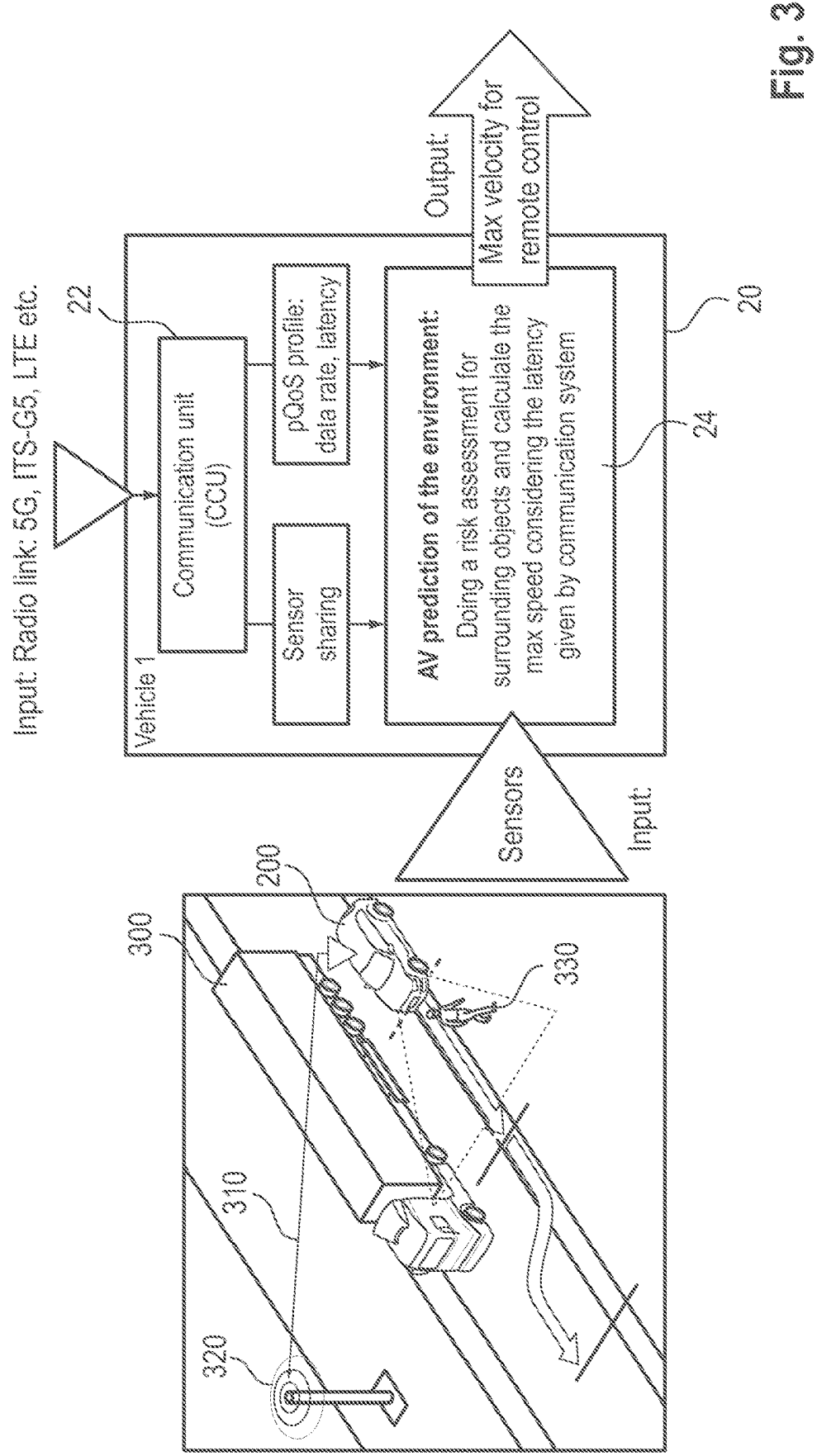
FIG. 3 illustrates a traffic scenario in an exemplary embodiment and a block diagram of a method in a tele-operated transportation vehicle.

FIG. 3 illustrates a traffic scenario in an exemplary embodiment and a block diagram of a method 10 in a tele-operated transportation vehicle 200. In the traffic scenario illustrated on the left of FIG. 3 an automatic transportation vehicle 200 is in an exceptional traffic scenario. A truck 300 is in the way of the transportation vehicle 200 and the transportation vehicle 200 needs to use the lane of the oncoming traffic to pass the truck 300. Since this situation cannot be resolved by the control mechanisms of the transportation vehicle 200 itself, a communication link 310 to a base station 320 and on to a control center has been established. FIG. 3 further indicates a pedestrian 330, which may cross the path of transportation vehicle 200. This situation makes clear that the transportation vehicle needs to be able to stop within a certain short distance. The determining 16 of the speed limit is therefore further based on a probability of an occurrence of an event triggering a time-critical reaction (pedestrian in front of the transportation vehicle) of the tele-operated transportation vehicle 200. A reaction time can be determined from the delay/latency of the communication link and the reaction time of the tele-operator. With a given maximum distance until stop of the transportation vehicle 200, the braking distance of the transportation vehicle, and the delay/latency a speed limit can be calculated. The probability of the occurrence of the event triggering the time-critical reaction is related to the environment of the tele-operated transportation vehicle 200 (e.g., the probability of a suddenly occurring pedestrian in front of the transportation vehicle 200 is higher on a sunny Saturday afternoon in a residential area than it is in the middle of the night on an abandoned highway during a week day).

FIG. 3 also illustrates an exemplary embodiment of an apparatus 20 on the right, which is implemented at the transportation vehicle 200 in this disclosed embodiment. The apparatus 20 comprises a communication unit 22, which is an implementation of the above-described one or more interfaces 22. The communication unit 22 may provide radio links to a CC, to an overlaying mobile communication system, and also to other transportation vehicles. Therewith, sensor sharing can be used to exchange information on the environment with other transportation vehicles or to communicate sensor data to the CC. There are multiple options on determining the environmental information in exemplary embodiments. For example, the obtaining 12 of the information related to the environment may comprise determining the information related to the environment based on sensor data of the tele-operated transportation vehicle 200 itself (video, radar, lidar, etc.), the obtaining 12 of the information related to the environment may comprise determining the information related to the environment based on sensor data shared among transportation vehicles in the environment of the tele-operated transportation vehicle 200 (data from sensors of other transportation vehicles), and/or the obtaining 12 of the information related to the environment may comprises receiving the information related to the environment from a communication network. For example, an environmental model may be formed by a server in the network, which provides such information to the apparatus 20. Yet another option is that the obtaining 12 of the information related to the environment comprises receiving the information related to the environment from traffic infrastructure in the environment of the tele-operated transportation vehicle. For example, traffic infrastructure (lights, signs, etc.) may generate information related to a traffic density, which can then be provided to the apparatus 20.

As further illustrated a pQoS profile comprising at least information related to a predicted latency and data rate may also be obtained at the apparatus 20. The obtaining 14 of the information related to the pQoS of the communication link between the tele-operated transportation vehicle 200 and the tele-operator of the transportation vehicle 200 may comprise receiving the information related to the pQoS from a communication system. E.g., the overlaying mobile communication system (e.g., 5G, LTE, ITS-G5 (Intelligent Transport System 5th Generation)) may provide such information to the apparatus 20. The apparatus 20 also comprises a control module 24, e.g., a processor, which performs a prediction of the environment at the automatic transportation vehicle 200.

Disclosed embodiments may then determine the speed limit taking into account both factors pQoS and the environment. Compared to a simple but inefficient approach, which selects a fixed low speed, e.g., 10 km/h, exemplary embodiments may allow a more adequate speed limit setting. For example, a risk assessment for surrounding objects may be carried out. A maximum speed considering the latency given by the communications system is then calculated. A maximum velocity (speed limit) may then be communicated for remote control, e.g., to a CC.

For example, if a braking distance of a transportation vehicle corresponds to the distance travelled in is (rough approximation for exemplary purposes only), then a transportation travelling at 10 m/s needs 10 m to stop. If the latency (round trip delay) in the network is 200 ms, then the transportation vehicle travels 2 m before an emergency brake command takes effect after an according situation has been sensed. The reaction distance of the transportation vehicle is then 12 m. Hence, if 12 m is the required reaction distance in a current traffic scenario and the latency is 200 ms, then the speed limit is 10 m/s. If in another environment the reaction distance is 24 m, then the speed limit is 20 m/s.

Disclosed embodiments may calculate a maximum speed of the AV 200 during the ToD by:

I. Obtaining 14 a forecast of the quality of service from the communication system;

II. Obtaining 12 an information on the surrounding environment;

III. Calculating 16 a probability of occurrence for an event triggering a time-critical reaction, which is often referred to as risk assessment and studied, e.g., by C. M. Hruschka, D. Töpfer and S. Zug, "Risk Assessment for Integral Safety in Automated Driving," 2019 2nd International Conference on Intelligent Autonomous Systems (ICoIAS), Singapore, Singapore, 2019, pp. 102-109. doi: 10.1109/ICoIAS.2019.00025; and IV. Calculating 16 the maximum speed of the AV 200 during the ToD considering the communication network parameters and the probability of occurrence for the event. The quality of service indicator can be the data rate, and/or the latency. The method 10 may can run on the transportation vehicle 200, where the surrounding environment information comes from sensors and collective perception. Alternatively, the method 10 may run at the CC or any other network component, where the surrounding environment information comes from the sensors of the AV, infrastructure, or the communication network itself. The calculated maximal speed may then be exchanged between the AV and the CC. The determining 16 of the speed limit may comprise determining a first lower speed limit for a first lower pQoS and the determining 16 of the speed limit may comprise determining a second higher speed limit for a second higher pQoS. The determining 16 of the speed limit may comprise determining a first lower speed limit for a first environment with first higher traffic dynamics and the determining 16 of the speed limit may comprise determining a second higher speed limit for a second environment with second lower traffic dynamics.

As already mentioned, in exemplary embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 10 method for determining a speed limit for a tele-operated transportation vehicle
12 obtaining information related to an environment of the tele-operated transportation vehicle
14 obtaining information related to a predictive quality of service, pQoS, of a communication link between the tele-operated transportation vehicle and a tele-operator of the transportation vehicle
16 determining the speed limit based on the information related to the environment of the tele-operated transportation vehicle and the information related to the pQoS
20 apparatus for a command center configured to teleoperate a transportation vehicle
22 one or more interfaces
24 control module
200 transportation vehicle, network component, entity
300 obstacle, truck
310 communication link
320 base station
330 pedestrian

The invention claimed is:

1. An apparatus for determining and setting a speed limit for a tele-operated transportation vehicle to control tele-operated operation of the tele-operated transportation vehicle being tele-operated, the apparatus comprising:
one or more interfaces configured to communicate in a communication network; and
a control module configured to determine a speed limit for the tele-operated transportation vehicle by:
obtaining environment information pertaining to an environment of the tele-operated transportation vehicle;
obtaining predictive Quality of Service (pQoS) information pertaining to a communication link between the tele-operated transportation vehicle and a tele-operator of the transportation vehicle within the communication network; and
determining the speed limit based on the environment information and the pQoS information, wherein the determined speed limit is thereafter set for limiting operation speed of the tele-operated transportation vehicle in the environment,
wherein the determining of the speed limit is further based on a probability of an occurrence of an event triggering a time-critical reaction of the tele-operated transportation vehicle, wherein the probability of the occurrence of the event triggering the time-critical reaction is related to the environment of the tele-operated transportation vehicle.

2. The apparatus of claim 1, wherein the control module is further configured to apply the speed limit to the tele-operated transportation vehicle during subsequent tele-operation.

3. The apparatus of claim 1, wherein the communication link comprises a wireless part and wired part and wherein the pQoS information pertains to at least the wireless part.

4. The apparatus of claim 1, wherein the pQoS information comprises at least one of a latency and a data rate.

5. The apparatus of claim 1, wherein the obtaining of the environment information comprises determining the environment information based on sensor data generated on the tele-operated transportation vehicle, based on sensor data shared among transportation vehicles in the environment of the tele-operated transportation vehicle, and/or based on information received from the communication network.

6. The apparatus of claim 1, wherein the determining of the speed limit comprises determining a first speed limit for a first pQoS and determining a second speed limit for a second pQoS, wherein the first speed limit is lower than the second speed limit and the first pQoS is lower than the second pQoS.

7. The apparatus of claim 1, wherein the determining of the speed limit comprises determining a first speed limit for a first environment with first traffic dynamics and determining a second speed limit for a second environment with second traffic dynamics, wherein the first speed limit is lower than the second speed limit and the first traffic dynamics are higher than the second traffic dynamics.

8. The apparatus of claim 1, wherein the obtaining of the environment information comprises receiving the environment information from traffic infrastructure in the environment of the tele-operated transportation vehicle.

9. The apparatus of claim 1, wherein a reaction time for the event triggering the time-critical reaction is determined as part of the speed limit determination, and the reaction time is determined based on the delay/latency of the communication link and a reaction time of the tele-operator.

10. The apparatus of claim 1, wherein the obtaining of the pQoS information comprises receiving the pQoS information from a communication system.

11. A transportation vehicle comprising the apparatus of claim 1.

12. A network component comprising the apparatus of claim 1.

13. A method for determining and setting a speed limit for a tele-operated transportation vehicle to control tele-operated operation of the tele-operated transportation vehicle being tele-operated, the method comprising:
    obtaining environment information pertaining to an environment of the tele-operated transportation vehicle;
    obtaining predictive Quality of Service (pQoS) information pertaining to a communication link between the tele-operated transportation vehicle and a tele-operator of the transportation vehicle within the communication network; and
    determining the speed limit based on the environment information and the pQoS information, wherein the determined speed limit is thereafter set for limiting operation speed of the tele-operated transportation vehicle in the environment, wherein the determining of the speed limit is further based on a probability of an occurrence of an event triggering a time-critical reaction of the tele-operated transportation vehicle, wherein the probability of the occurrence of the event triggering the time-critical reaction is related to the environment of the tele-operated transportation vehicle.

14. The method of claim 13, further comprising applying the speed limit to the tele-operated transportation vehicle during subsequent tele-operation.

15. The method of claim 13, wherein the communication link comprises a wireless part and wired part and wherein the pQoS information pertains to at least the wireless part.

16. The method of claim 13, wherein the pQoS information comprises at least one of a latency and a data rate.

17. The method of claim 13, wherein the obtaining of the environment information comprises determining the environment information based on sensor data generated on the tele-operated transportation vehicle, based on sensor data shared among transportation vehicles in the environment of the tele-operated transportation vehicle, and/or environment information received from a communication network.

18. The method of claim 13, wherein the determining of the speed limit comprises determining a first speed limit for a first pQoS and determining a second speed limit for a second pQoS, wherein the first speed limit is lower than the second speed limit and the first pQoS is lower than the second pQoS.

19. The method of claim 13, wherein the determining of the speed limit comprises determining a first speed limit for a first environment with first traffic dynamics and determining a second speed limit for a second environment with second traffic dynamics, wherein the first speed limit is lower than the second speed limit and the first traffic dynamics are higher than the second traffic dynamics.

20. The method of claim 13, wherein the obtaining of the environment information comprises receiving the environment information from traffic infrastructure in the environment of the tele-operated transportation vehicle.

21. The method of claim 13, wherein a reaction time for the event triggering the time-critical reaction is determined as part of the speed limit determination, and the reaction time is determined based on the delay/latency of the communication link and a reaction time of the tele-operator.

22. The method of claim 13, wherein the obtaining of the pQoS information comprises receiving the pQoS information from a communication system.

23. A non-transitory computer readable medium including a computer program having a program code for performing the method of claim 13, when the computer program is executed on a computer, a processor, or a programmable hardware component.

* * * * *